United States Patent
Zolnier et al.

(10) Patent No.: US 7,172,984 B2
(45) Date of Patent: Feb. 6, 2007

(54) FUSE HOUSING OF TARGETED PERCENTAGE TETRAGONAL PHASE ZIRCONIA AND METHOD OF MANUFACTURE

(75) Inventors: S. Scott Zolnier, Scottsville, NY (US); Charles E. Aldridge, Penfield, NY (US); Clifford W. Rabidoux, Rochester, NY (US); Peter R. Mundt, Scottsville, NY (US)

(73) Assignee: Heany Industies, Inc., Scottsville, NY (US)

( * ) Notice: Subject to any disclaimer, the term of this patent is extended or adjusted under 35 U.S.C. 154(b) by 158 days.

(21) Appl. No.: 10/869,997

(22) Filed: Jun. 17, 2004

(65) Prior Publication Data

US 2005/0282697 A1    Dec. 22, 2005

(51) Int. Cl.
*C04B 35/486* (2006.01)
*H01H 85/20* (2006.01)

(52) U.S. Cl. ............... 501/134; 501/135; 501/152; 501/153; 337/186; 174/52.1

(58) Field of Classification Search ............ 501/134, 501/135, 152, 153; 337/186; 174/52.1
See application file for complete search history.

(56) References Cited

U.S. PATENT DOCUMENTS 3,920,882 A    11/1975    Venkatu
4,630,023 A  * 12/1986    Gawron et al. ............. 337/407
4,752,427 A  *  6/1988    Wakai et al. ............... 264/320
4,772,576 A     9/1988    Kimura et al.
4,829,028 A     5/1989    Seki et al.
5,055,433 A    10/1991    Niwa et al.
5,183,610 A  *  2/1993    Brog et al. ................ 501/105
5,238,627 A     8/1993    Matsuhisa et al.
5,338,713 A     8/1994    Takagi et al.
5,505,865 A     4/1996    Kumar et al.
5,753,160 A     5/1998    Takeuchi et al.
5,770,994 A     6/1998    Evans
5,877,105 A     3/1999    Iwai et al.
6,024,787 A     2/2000    Lee
6,051,171 A     4/2000    Takeuchi et al.
6,395,117 B1    5/2002    Takeuchi et al.
2002/0190837 A1* 12/2002   Kalra et al. ................ 337/187

OTHER PUBLICATIONS

Detroit Diesel, "SERIES 60 Service Information", Bulletin No. 7-60-02. Dec. 2002, pp. 1-22 (enclosed).
Detroit Diesel, "SERIES 60 Service Manual", Bulletin No. 7-60-02. Dec. 2002, pp. (6-33 to 6-49s) (enclosed).

* cited by examiner

*Primary Examiner*—David Sample
(74) *Attorney, Agent, or Firm*—Stephen B. Salai, Esq.; Brian B. Shaw, Esq.; Harter Secrest & Emery LLP

(57) ABSTRACT

A ceramic fuse housing is provided for surface mount circuit protectors, wherein a selectively destructible fuse is at least partially retained within the fuse housing. The fuse housing being formed of between 80% to 90% alumina and 20% to 10% zirconia, wherein 5% to 25% of the zirconia is in a tetragonal phase.

12 Claims, 3 Drawing Sheets

FUSE HOUSING OF TARGETED PERCENTAGE TETRAGONAL PHASE ZIRCONIA AND METHOD OF MANUFACTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to ceramic fuse housings and, more particularly, to a ceramic fuse housing having a targeted percentage of tetragonal zirconia to provide enhanced resistance to thermal shock while maintaining sufficient resistance to structural failure.

2. Description of Related Art

Fuse housings are used in conjunction with an electrical conductor, wherein the electrical conductor is designed to fail when subject to a predetermined power. Typically, when the electrical conductor fails, there is a physical dispersion of material accompanied by a thermal surge. It is generally preferable to contain these effects of the electrical conductor failure so as to protect adjacent circuitry.

Design criteria and a trend toward miniaturization often limit the available space for containing the failure of the electrical conductor. The containment of the electrical conductor failure must withstand the dynamic effects of the exploding conductor as well as the accompanying thermal load.

Therefore, the need exists for a fuse housing that can provide sufficient strength and resistance to thermal shock while precluding restrikes. The need also exists for a fuse housing that can be repeatedly manufactured to exhibit desired structural integrity and resistance to thermal shock. The need further exists for a fuse housing having reduced sizing requirements.

BRIEF SUMMARY OF THE INVENTION

The present invention provides a ceramic fuse housing having a balanced resistance to thermal shock and physical strength. It has been found by providing the appropriate balance between the resistance to thermal shock and physical strength of the fuse housing, the fuse housing can surpass the operating limitations of prior devices.

A fuse housing in accordance with the present invention includes a multitude of ceramic partially stabilized zirconia grains, wherein between approximately 10% to 20% of the ceramic zirconia grains retain the tetragonal structure. The remaining zirconia is in a monoclinic phase.

The present invention also provides a method of forming a composite for sintering, wherein the composite includes between approximately 90% to 80% (percentage by weight) alumina, with up to 10% sintering aids in the alumina, and 10% to 20% of zirconia, wherein the zirconia is at least partially stabilized.

The present invention further contemplates a method of forming the composite, wherein the alumina and zirconia are individually spray dried and subsequently mixed together.

Thus, the present invention provides for the manufacture and composition of fuse housings that can be further assembled into surface mount telecom circuit protectors to protect circuitry from overcurrent conditions caused by power cross or lightning occurrences.

The fuses can comply with telecom regulatory standards including Bellcore GR 1089, Underwriters Laboratory (UL) 1950/60950, and FCC part 68. These surface mount fuses can be used in telecommunication equipment including line cards, modems, fax machines, PCs, phones, answering machines, caller ID devices and other products connected to a phone network. Further, responding to the ever-increasing circuit board size constraints, surface mount fuses employing the present fuse housing are compact yet provide enhanced protection and high power density in reduced package size.

The present fuse housing incorporates the findings that fuse housing performance corresponds to the proportions of monoclinic and tetragonal zirconia crystalline phases in the sintered ceramic. It has been further determined that the proportions of monoclinic and tetragonal zirconia crystalline phases in the sintered ceramic can be controlled by the sintering (firing) cycle. Elevated heat and extended duration of hold times will reduce the amount of a tetragonal crystalline phase. As the amount of tetragonal crystalline phase decreases, the resistance of the resultant ceramic to thermal shock increases. Conversely, it has been found that as the amount of tetragonal zirconia increases, the physical strength increases and the thermal shock resistance decreases.

BRIEF DESCRIPTION OF THE SEVERAL VIEWS OF THE DRAWING(S)

DETAILED DESCRIPTION OF THE INVENTION

Figure 1:
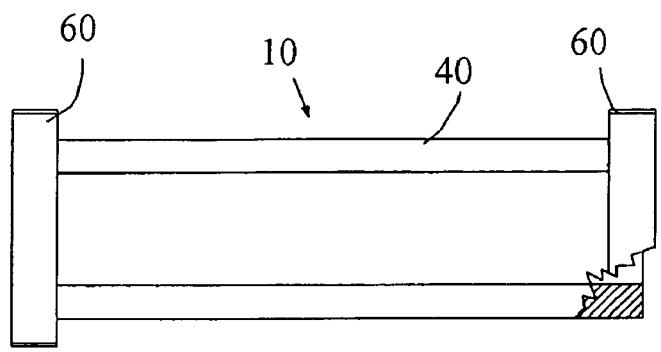
FIG. 1 is a side elevational, partial cross-sectional view of a representative fuse housing.
Figure 2:
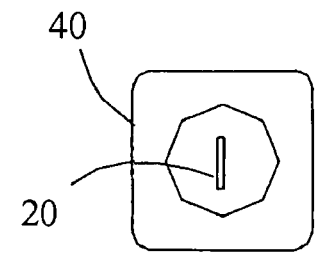
FIG. 2 is an end elevational view of a fuse housing encompassing a fuse.

Referring to FIG. 1, a fuse assembly 10 is shown, wherein the assembly includes a fuse 20, a fuse housing 40 and terminal contacts 60.

The fuse 20 is a frangible element selected to fail upon experiencing a predetermined power. The fuse housing 40 is sized to enclose the frangible portion of the fuse 20. The terminal contacts 60 are electrically connected to the fuse 20 and are often supported by a portion of the housing 40. The particular construction of the fuse assembly 10 is set forth for purposes of illustration and does not limit the scope of the present invention.

In use, the fuse 20 is a metal wire located within the central passageway of the ceramic fuse housing 40. When an overcurrent condition occurs, such as caused by lightning or power cross, the metal wire vaporizes producing a thermal shock and a debris wave, and the fuse housing 40 absorbs the debris and thermal shock of the vaporizing wire fuse without rupturing or reestablishing excess current. As a result, the associated circuitry is protected, thereby reducing shock and fire hazards as well as maintaining the integrity of the overvoltage protector.

The fuse housing 40 can have any of a variety of configurations, such as but not limited to tubes, boxes, spheres, sleeves, plates or cones. For purposes of description, the fuse housing 40 is set forth as a generally rectangular member having a central passage for receiving the fuse 20.

The fuse housing 40 is a ceramic including a sintered composite of primarily alumina and zirconia. The fuse housing 40 is formed by processing a composition of alumina and zirconia and can be divided into three major steps: (1) preparation of the powder; (2) the forming the powder into parts; (3) firing or sintering; as required.

Figure 3:
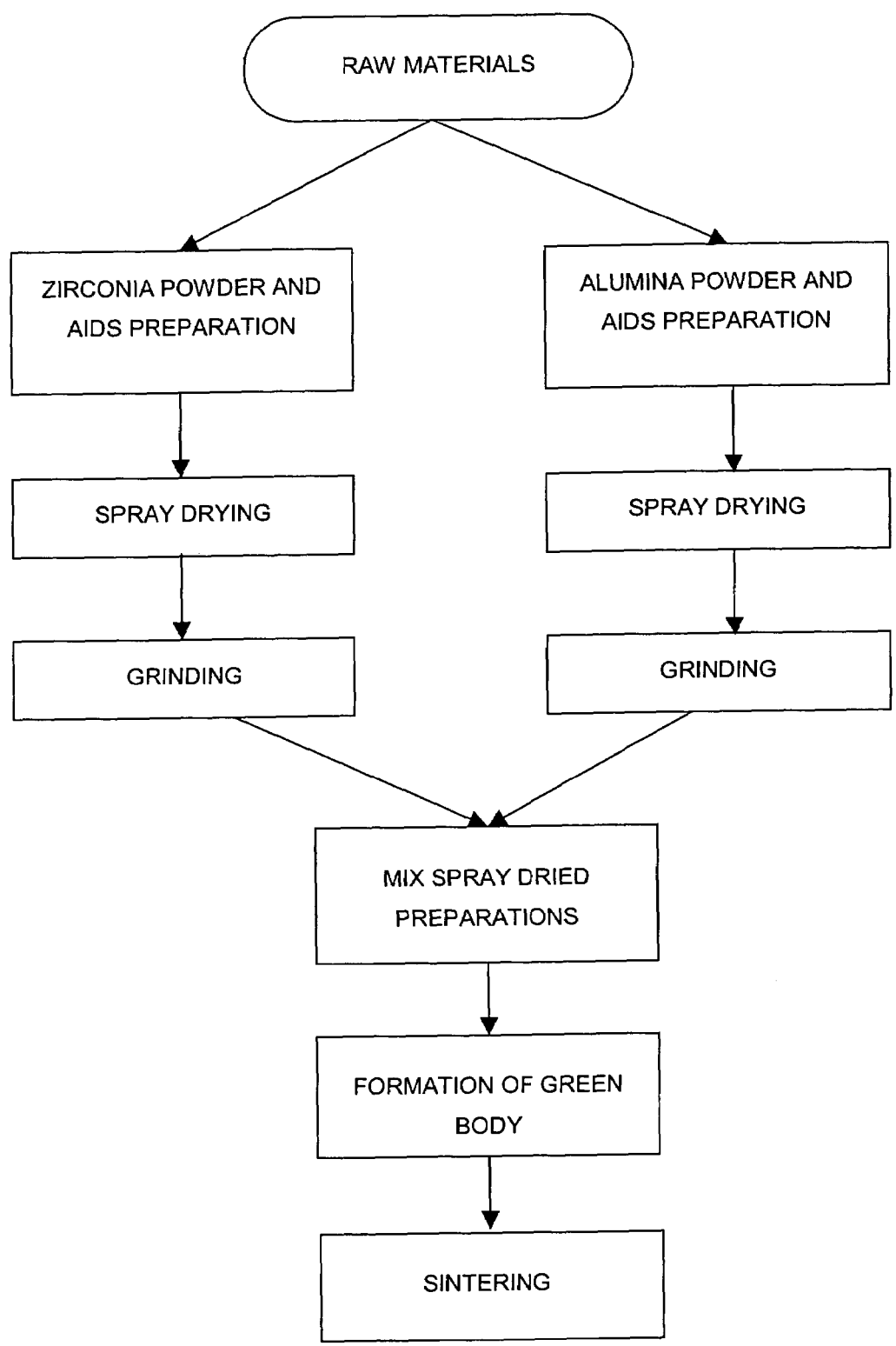
FIG. 3 is a processing flow diagram for the manufacture of the fuse housing.

Referring to FIG. 3, a typical powder processing diagram is shown. The first step in the preparation of the powder starts with measuring the major constituents. For the present fuse housing 40, the primary constituents are alumina and zirconia are individually processed and then mixed together to form a composite.

The alumina, $Al_2O_3$, preferably forms between approximately 75% to 95%, and more preferably approximately 80% to 90%, and most preferably approximately 85% by weight of the composite. The alumina can have between approximately 90% to 99.9% purity. That is, the alumina can include sintering aids and grain growth inhibitors including but not limited to magnesia, silica, and calcia. Typically, the percentage of the sintering aid is between approximately 0.1% and 10% of the weight of the alumina. Thus, the sintering aid can provide from approximately 0.9% to 9.9% of the composite, by weight. If sintering aids are employed, the sintering aids and the alumina are weighed and thoroughly mixed into a homogeneous mixture. The mixture can be formed in a dry process or water can be added to form a slurry, and then mixed in a ball mill. When wet mixing is employed, a drying procedure, such as spray drying, is employed to reduce moisture content prior to forming/calcining/sintering. The alumina mixture is then reduced to an average particle size of 60–70 microns.

A satisfactory alumina has been found to be C72UG & C90WB sold by Alcan Aluminum. Satisfactory sintering aids are marketed under the names Tall, Whiting, & Silica, as are available from Whitacker Clark & Daniels, U.S. Silica Corp.

Pure zirconia has three polymorphic forms: a monoclinic phase, tetragonal phase and cubic phase based on a temperature at atmospheric pressure. In the case of pure zirconia, the zirconia exhibits a cubic phase from a melting point of 2370° C. when cooling the zirconia at a high temperature, a tetragonal phase forms from about 2370° C. to about 1170° C., and a monoclinic phase forms below 1170° C. To prevent a martensitic phase transformation, an oxide such as MgO, CaO, $Y_2O_3$, $CeO_2$ is added as a stabilizing agent for stabilizing a cubic phase or tetragonal phase which is stable in high temperature.

Although the zirconia can be used in a relatively pure form, it has been found advantageous to at least partially stabilize the zirconia. The stabilizing agents yttria ($Y_2O_3$,) magnesia (MgO), calcia (CaO) and ceria ($CeO_2$) are commercially available. The stabilizing agents can represent approximately up to 10 percent of the zirconia.

The zirconia (and any stabilizing agent) is wet mixed to form a slurry, which is then spray dried and ground to a particle size of 40–60 microns.

The zirconia (zirconium oxide), $ZrO_2$, is a commercially available commodity, such as HSY-3SD, sold by American Vermiculite.

The processed alumina and zirconia which contain stabilizers, binders and lubricants are then dry mixed and formed into a green (unsintered) body.

The next step in the processing is the formation of the green component or part, such as the housing. The most commonly used technique is dry pressing the powder into the housing configuration. Other techniques include extruding and isostatic pressing. Dry pressing or compacting can be done using a combined action of a top and a bottom punch in a cavity such that a substantially uniform density in the part is obtained. Commercially available presses and tooling technology enable the pressing of multiple parts in very complex core shapes.

Sintering shrinkage is a function of the density of the green (unsintered) part, and thus the press density is controlled to achieve a desired sintered dimension. Further, green density uniformity must be controlled over the entire volume of a pressed part to prevent distortion upon sintering such as warpage or cracking.

Sintering

The sintering transforms the green body in a ceramic of the fuse housing 40. During the sintering phase, the alumina and zirconia densify and the ceramic acquires the mechanical and thermal shock-resistant characteristics.

Figure 4:
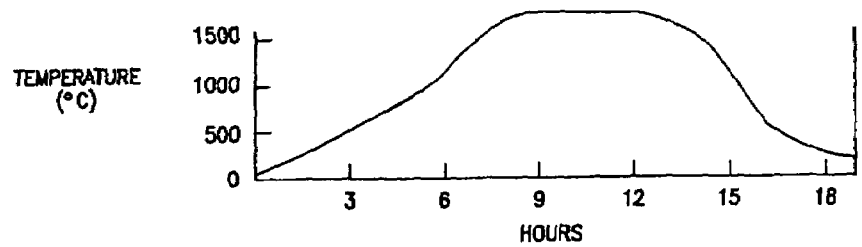
FIG. 4 is a graph of a representative sintering cycle.

Sintering includes heating the parts in a kiln or furnace. The specific temperature profile and environment in which the sintering occurs depends on the specific part and composition of the ceramic. As shown in FIG. 4, the temperature profile is varied throughout the sintering process.

The sintering of an alumina-zirconia composite requires a relationship between time and temperature along each phase of the sintering cycle. Sintering starts with a gradual ramping up from room temperature to approximately 400° C. as binders, and lubricants are burned out of the product. The atmosphere during the sintering cycle is oxidising.

The temperature is further increased to the final sinter temperature of approximately 1600° C.–1700° C., depending on the type of material. After reaching the desired temperature, the parts are gradually cooled to room temperature at a pre-determined rate.

Temperatures constituting the sintering process are maintained within narrow tolerances in order that the desired tetragonal content is obtained. Improper control during the initial stages of sintering can result in physical problems due to overly rapid binder removal. Poorly controlled initial stages of heating or later stages of cooling can result in stress-induced fracture.

During sintering, the parts shrink to their final dimensions. Different material and processing techniques result in variance in this shrinkage, but typical linear shrinkage ranges from 10% to 20% of the formed dimensions.

The sintered parts can be finished by any of a variety of mechanisms, including but not limited to tumbling in a flowable medium such as grit, sand, or spheres or particles of ceramic, glass, sand, or metal. The tumbling media and tumbling parameters are dictated by the composition of the part, the part size and desired finishing.

In assembly, the fuse 20 is disposed within the fuse housing 40, and the contacts 60 are attached, by methods well known in the art.

The fuse housings 40 of the present invention are sufficiently robust to accommodate high strike—high stress closing angles without rupture. While the present fuse housings 40 may have a reduced physical strength with respect to a high percentage tetragonal zirconia, the present housings having limited tetragonal zirconia can accommodate the thermal shock associated with high stress closing angles.

It has been found that if the percentage of tetragonal zirconia is too low, then restriking of the fuse 20 is likely. Conversely, if the percentage of tetragonal zirconia is too great, the fuse housing 40 tends to fracture or explode upon high stress closing angles. Thus, the present composition and sintering profile provide a resulting ceramic having a balance between restriking and exploding.

Figure 5:
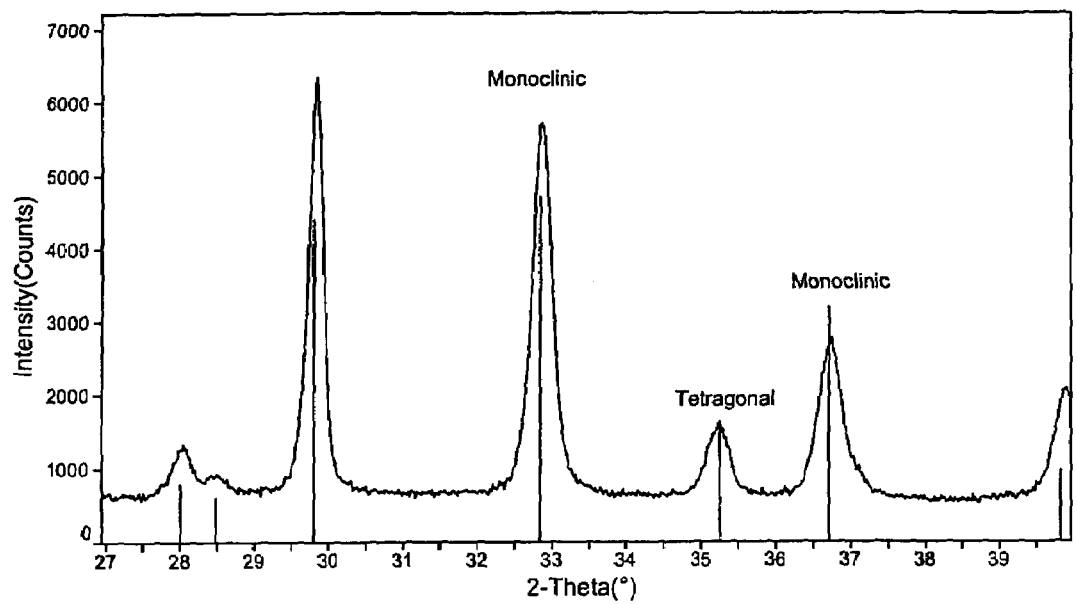
FIG. 5 is a representative graph showing relative amounts of tetragonal and monoclinic zirconia phases within a ceramic of the fuse housing.

A satisfactory fuse housing can be formed of approximately 80% to 90% alumina (with up to 5% sintering aids) and approximately 20% to 10% partially stabilized zirconia where approximately 10% to 20% of the zirconia is in the tetragonal phase, with a more satisfactory fuse housing being 85% alumina (with up to 10% sintering aids) and 15% partially stabilized zirconia, wherein between approximately 10% to 20% of the zirconia is tetragonal. Thus, between approximately 1.5% to 3.0% of the fuse housing 40 is tetragonal zirconia, by weight. In FIG. 5, a graph showing the tetragonal zirconia in the satisfactory resulting fuse housing 40 is shown.

The fuse housing 40 can be employed in surface mount fuses rated at 250 Volts AC and designed to pass interrupting ratings from 250VAC at 50 A to 600VAC from 40 A to 60 A. The AC interrupting ratings are measured at designated voltage with 100% power factor. The requirement of 600V and 60 A interrupting ratings are performed by closing the circuit between 50° and 70° on the voltage wave, whereas peak power for a resistive current occurs at 90° along the sine wave.

The present fuse housings 40 can provide increased protection for a 600V and 60 A interrupt rating when subjected to closing the circuit at high stress closing angles greater than 70°. That is, the fuse housings 40 can pass the overcurrent tests without rupturing or exhibiting restrikes. Restrikes are undesirable conditions where the current path is reestablished after the overcurrent condition has occurred. In contrast to prior fuse housings that can be rated for 60 A and 600V and pass short circuit testing requirements at closing angles less than 70°, which is a lower energy level test, the present fuse housings 40 can satisfy the test requirements at closing angles between 70° and 110°.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

The invention claimed is:

1. A ceramic fuse housing, comprising:
   (a) a multitude of zirconia ceramic grains, wherein between approximately 5% to 25% by volume of the zirconia ceramic grains are tetragonal.

2. The ceramic fuse housing of claim 1, wherein between approximately 10% to 20% by volume of the zirconia ceramic grains are tetragonal.

3. The ceramic fuse housing of claim 1, further comprising a multitude of alumina ceramic grains.

4. The ceramic fuse housing of claim 1, further comprising between approximately 75% to 95% by weight alumina.

5. A ceramic fuse housing, comprising:
   (a) between approximately 75% to 95% by weight of alumina; and
   (b) between approximately 25% to 5% by weight of zirconia, wherein between 5% to 25% by volume of the zirconia, is a tetragonal phase.

6. The ceramic fuse housing of claim 5, wherein the alumina is between approximately 90% to 99.9% pure.

7. The ceramic fuse housing of claim 5, wherein the zirconia is partially stabilized.

8. The ceramic fuse housing of claim 5, wherein the zirconia is stabilized with one of yttria, magnesia, calcia, or ceria.

9. A method of forming a ceramic fuse housing, comprising:
   (a) sintering a composite including zirconia to render between approximately 5% to 25% by volume of the zirconia in a tetragonal phase at room temperature.

10. The method of claim 9, further comprising forming the composite of approximately 75% to 95% by weight alumina and 5% to 25% by weight zirconia.

11. The method of claim 9, further comprising including a phase stabilizer in the zirconia.

12. A method of forming a ceramic fuse housing, comprising:
   (a) forming a green body of approximately 5% to 25% by weight partially stabilized zirconia, approximately 75% to 95% by weight alumina and up to approximately 10% by weight sintering aid; and sintering the green body with a time-temperature profile and atmosphere to form a sintered fuse body having between 5% and 25% by volume of the partially stabilized zirconia being tetragonal zirconia.

* * * * *

UNITED STATES PATENT AND TRADEMARK OFFICE
CERTIFICATE OF CORRECTION

PATENT NO.         : 7,172,984 B2                                        Page 1 of 1
APPLICATION NO. : 10/869997
DATED              : February 6, 2007
INVENTOR(S)        : S. Scott Zolnier et al.

It is certified that error appears in the above-identified patent and that said Letters Patent is hereby corrected as shown below:

On the title page item (73), correct the spelling of the name of the Assignee as follows:

Heany Industries, Inc.
    Scottsville, New York.

Signed and Sealed this

Tenth Day of April, 2007

JON W. DUDAS
*Director of the United States Patent and Trademark Office*